United States Patent
Ishii et al.

(10) Patent No.: US 8,454,339 B2
(45) Date of Patent: Jun. 4, 2013

(54) ERASER MOULDING TOY AND METHOD OF FORMING AN ERASER

(75) Inventors: Namiko Ishii, Tokyo (JP); Makoto Koike, Nagoya (JP)

(73) Assignees: Bandai Co., Ltd., Tokyo (JP); Royal Industries Co., Ltd., Aichi (JP)

( * ) Notice: Subject to any disclaimer, the term of this patent is extended or adjusted under 35 U.S.C. 154(b) by 556 days.

(21) Appl. No.: 12/629,089

(22) Filed: Dec. 2, 2009

(65) Prior Publication Data

US 2010/0133720 A1    Jun. 3, 2010

(30) Foreign Application Priority Data

Dec. 3, 2008    (JP) .................. 2008-308759

(51) Int. Cl.
*B29C 35/08*    (2006.01)

(52) U.S. Cl.
USPC ........... 425/123; 425/383; 425/392; 425/394; 264/402; 264/247; 264/320

(58) Field of Classification Search
USPC .................. 425/123, 383, 392, 394; 264/402, 264/247, 320
See application file for complete search history.

(56) References Cited

U.S. PATENT DOCUMENTS

| | | | | |
|---|---|---|---|---|
| 1,513,439 A | * | 10/1924 | Wickers | 264/160 |
| 1,957,133 A | * | 5/1934 | Davis | 99/424 |
| 2,404,322 A | | 7/1946 | Southard | |
| 2,582,692 A | * | 1/1952 | Funke | 99/381 |

FOREIGN PATENT DOCUMENTS

| | | | |
|---|---|---|---|
| DE | 3045207 A | * | 8/1982 |
| JP | 3142498 U | | 5/2008 |

OTHER PUBLICATIONS

English machine translation of DE3045207, retrieved from EPO database Mar. 27, 2012.*
http://www.bandai-asia.com/newsite/productDetail.php?id=GIRL &sid=8&gid=88&tid=508 (retrieved Mar. 27, 2012, copyright 2009).*
http://www.modelairplanebuilding.com/preparation.html (2005, retrieved Aug. 21, 2012).

* cited by examiner

*Primary Examiner* — Timothy Kennedy

(57) ABSTRACT

To provide an eraser molding toy with which it is possible to mold an eraser having a colored pattern or design, a plurality of thermofusible eraser members 1 of differing colors are placed in succession inside a molding container 2 so as to form a required pattern or design etc., and the molding container 2 is heated in order to fuse the surfaces of the eraser members 1 together to mold an eraser P having a colored pattern or design in the mold shape of the container.

9 Claims, 10 Drawing Sheets

ERASER MOULDING TOY AND METHOD OF FORMING AN ERASER

CROSS-REFERENCES TO RELATED APPLICATION

This application claims priority under 35 U.S.C. §119 from Japanese Patent Application Serial No. 2008-308759 filed Dec. 3, 2008, the disclosure of which is incorporated by reference herein in its entirety.

TECHNICAL FIELD

The present invention relates to an eraser moulding toy, more particularly to a toy for moulding an eraser having a suitably coloured pattern or design, and a method of forming an eraser.

BACKGROUND

There are known toys for producing erasers, as presented in Japanese Utility Model Registration No. 3142498, for example, in which clay which hardens by heating is moulded into a required three-dimensional shape using a mould, and this clay moulding is received in a container together with a suitable amount of water and heated in a microwave oven to harden the clay moulding, whereby a three-dimensional eraser is produced.

SUMMARY

Young children etc. are fond of coloured erasers having a suitable pattern or design, but it is not possible to obtain this kind of eraser having a pattern or design with conventional toys for producing erasers.

Furthermore, there are many different steps involved in producing the conventional eraser, including: kneading the clay, moulding the clay with a mould, impregnating the clay moulding in a container containing water, and heating the moulding in a microwave oven, and therefore it is difficult for young children etc. to easily prepare erasers.

The present invention therefore provides an eraser moulding toy with which an eraser having a coloured pattern or design can be moulded simply even by young children etc.

The main features of the eraser moulding toy according to the present invention lie in the fact that it comprises: a plurality of eraser members made of thermofusible coloured synthetic resin, and a moulding container for housing the plurality of eraser members in a state of contact; and a plurality of different coloured eraser members are housed in the moulding container so that a required pattern or design is formed by the end faces thereof, and it is possible to mould an eraser in which the surfaces of the eraser members are fused together by heating the moulding container.

The eraser members are picked up one at a time using tweezers, for example, and placed along the inner surface of the moulding container in an ordered fashion and a state of contact. In this process, different coloured eraser members are placed inside the moulding container in succession in a required pattern or design etc. and received in the moulding container. By means of this, the required coloured pattern or design etc. is formed on the planar surface of the housed eraser members, which have the required area, by the end faces of the eraser members. The areas between the eraser members are then impregnated with a suitable amount of water, by dripping a suitable amount of water onto the planar surface of the housed eraser members using a dropper, for example. This water is heated to the required temperature so that the surfaces of the eraser members fuse together, and an eraser having a coloured pattern or design is moulded in the mould shape of the container.

According to the present invention, a plurality of eraser members made of a thermofusible coloured synthetic resin are housed in the moulding container in a state of contact so as to form the required pattern or design etc., and the moulding container is heated to cause the surfaces of the eraser members to fuse together, whereby it is possible to mould an eraser having a coloured pattern or design in a specific moulded shape.

In this way, even young children etc. are easily capable of moulding the eraser having a pattern or design because the process to mould the eraser only involves an operation to place the plurality of eraser members one at a time in the moulding container so that they are housed in a state of contact, and then heating; no especially difficult operations are required.

Moreover, the required pattern or design etc. is gradually completed using a process in which different coloured eraser members are housed in a state of contact in the moulding container, and therefore the young child etc. can be motivated to create the pattern or design etc., which is a source of interest for the young child etc.

The present invention will be described in detail below by way of non-limiting examples with reference to the accompanying Figures, in which:

BRIEF DESCRIPTION OF DRAWINGS

Other features and advantages of the present eraser moulding toy and method of forming an eraser will be apparent from the ensuing description, taken in conjunction with the accompanying drawings, in which:

As shown in FIG. 1, the eraser moulding toy of this mode of embodiment is arranged as a set comprising: a plurality of eraser members 1 having the same shape; a moulding container 2; a design sheet 3; a spacer 4; and tweezers 5, etc.

DESCRIPTION

Figure 1:
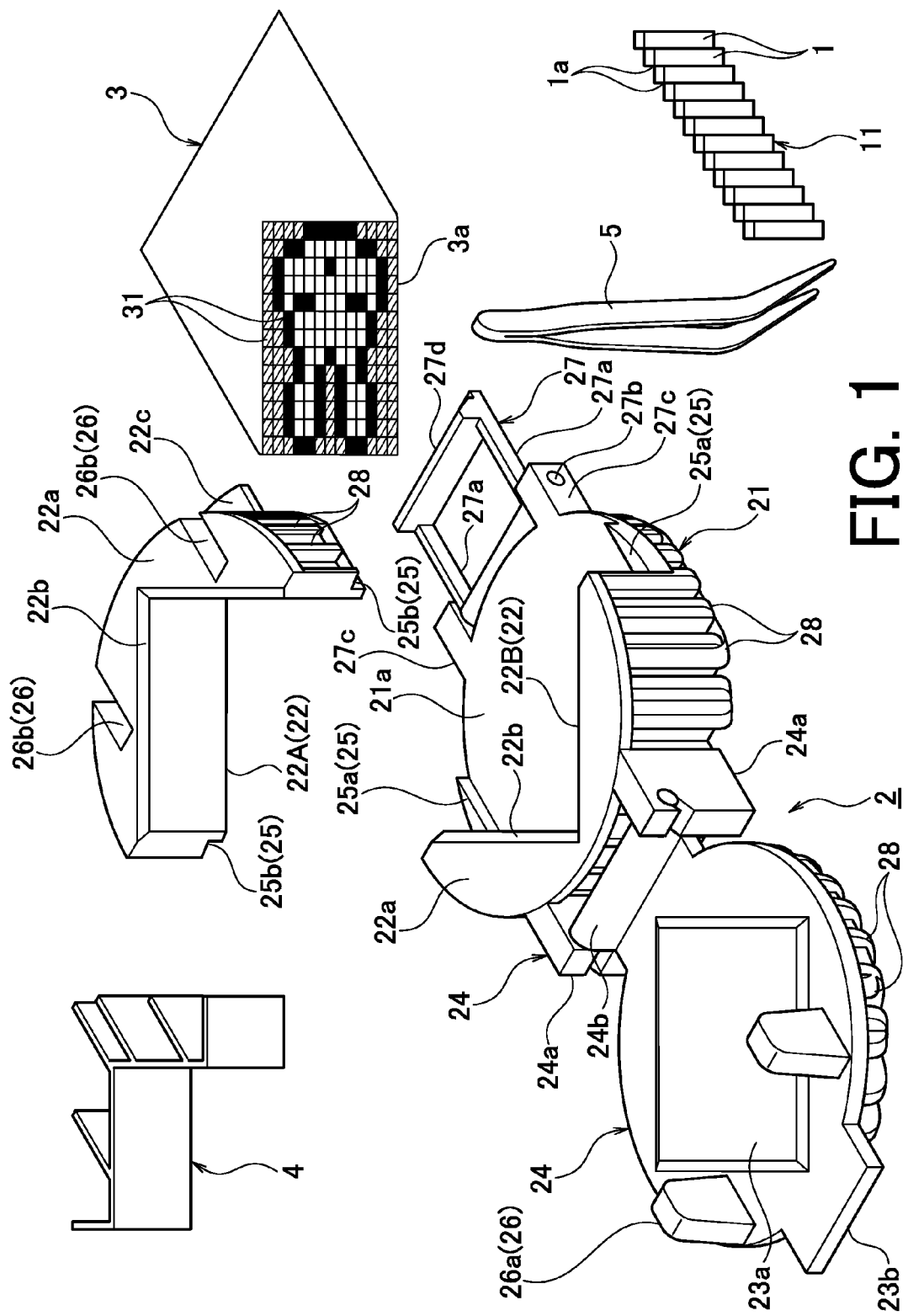
FIG. 1 is an oblique view showing an example of an eraser moulding toy set according to the present invention.

A description will now be given, referring to embodiments of the present eraser moulding toy and method of forming an eraser. While the claims are not limited to such embodiments, an appreciation of various aspects of the present eraser moulding toy and method of forming an eraser is best gained through a discussion of various examples thereof.

The eraser members 1 are formed with a predetermined cross-sectional shape using thermofusible coloured synthetic resin which allows these members to be fused together by heating. The eraser members 1 are formed as the same shape, with a length corresponding to the thickness of the eraser P which is the final moulded article and the same suitable cross-sectional size (stick-shaped); the members have a square cross section of small size, with sides of several mm, for example. This makes it possible to fuse the eraser members together by surface contact over a broader range and to fix them more securely compared with fusion using point contact of spherical eraser members, for example.

Furthermore, the eraser members 1 may be moulded as single pieces, but in this mode of embodiment they are formed as linked pieces 11, each of differing colour, in which a plurality of eraser members 1 of the same colour are linked together in a strip shape of a specific length with thin parts 1a at the corners in cross section forming the boundaries therebetween which can be cut, and the eraser members are cut one at a time from the thin parts 1a when they are used.

The eraser members 1 should be made of a material which allows the closely contacted surfaces thereof to fuse together under heating produced by a heater (e.g. a microwave oven) which will be described later; for example, it is possible to use a synthetic resin comprising: styrene-butadiene elastomer 65-70%; olefin 30-35%, in addition to around 1% each of calcium carbonate, vegetable oil, mineral oil, non-metallic binder and curing agent.

The moulding container 2 houses the eraser members 1 in a state of contact, and it is made of a heat-resistant synthetic resin which can withstand heating by the heater, for example polyamide resin, polyimide resin, ABS resin, or a fluororesin.

The moulding container 2 comprises a container main body 21 which has a moulding part 22 of the required shape and which is open at the top in order to house the eraser members 1 upright, as shown in FIGS. 4 to 7; and a cover member 23 which is pivotably linked to the peripheral side of the container main body 21 by way of a hinge mechanism 24 and can close the top opening of the moulding part 22.

In this mode of embodiment, the moulding part 22 is formed as a square, wherein one corner of the square is disposed on the side where the hinge mechanism 24 is provided.

Furthermore, the container main body 21 is formed as a circular shape overall, in which the moulding part 22 is formed with a circular bottom plate 21a to a specific height on the peripheral wall, and a flange 22a is formed as a circular plate concentric with the bottom plate 21a at the upper opening edge of the moulding part 22.

The cover member 23 is formed as a circular plate of substantially the same diameter as the flange 22a and overlies the flange 22a of the moulding part 22.

The upper opening edge of the moulding part 22 is moulded with an obliquely bevelled shape, and a slightly protruding step part 23a of which the peripheral edge fits together with the bevelled moulded portion 22b at the upper opening edge is formed in the centre of the cover member 23 corresponding to the moulding part 22; this step part 23a enters the upper opening edge of the moulding part 22 so as to be able to seal closed the inside of the moulding part 22.

Furthermore, a semiperipheral part of the moulding part 22 consists of a moveable frame 22A which can be detached from the container main body 21. In this mode of embodiment, the half of the moulding part 22 opposite the side close to the hinge mechanism 24 is separated from the flange 22a along a diagonal line and constitutes the moveable frame 22A which has been separately moulded; the half which is on the side of the container main body 21 close to the hinge mechanism 24 which is moulded as a single piece with the bottom plate 21a constitutes a fixed frame 22B.

A positioning part 25 is formed on both sides of the section where the moveable frame 22A and the fixed frame 22B meet. The positioning part comprises protrusions 25a which protrude from a peripheral part of the container main body 21 and grooves 25b which are formed in a peripheral part of the moveable frame 22A. The grooves 25b can be engaged with the protrusions 25a in the plane of and perpendicular to the plane of the bottom plate 21a of the container main body 21.

Furthermore, the outer edge at the bottom of the moveable frame 22A is formed as a flat, substantially semicircular surface which comes into sliding contact with the bottom plate 21a of the container main body 21.

The hinge mechanism 24 comprises a pair of brackets 24a which project from a peripheral part of the container main body 21 and an arm 24b which projects from a peripheral part of the cover member 23; the arm 24b is pivotably linked to the brackets 24a by way of a hinge pin 24c which projects from the outer surface of the arms 24b.

Furthermore, the hinge point of the hinge mechanism 24 is set substantially in the extension of the surface of the flange 22a of the moulding part 22, and is designed so that the cover member 23 can come into parallel abutment with the surface of the flange 22a when the cover member 23 is closed.

As described above in this mode of embodiment, a semiperipheral part of the moulding part 22 consists of the moveable frame 22A, and therefore a moveable frame fixing mechanism 26 is provided to restrict the play of the moveable frame 22A in the direction of detachment when the cover member 23 is closed. This moveable frame fixing mechanism 26 may comprise a pair of latching grooves 26b which are provided in the flange 22a of the moveable frame 22A, and a pair of latching protrusions 26a which project from the inner surface at the free end of the cover member 23 and are inserted into the latching grooves 26b when the cover member 23 is closed, for example.

A latching member 27 for releasably locking the cover with a tongue piece 23b extending from the free end of the cover member 23 is provided at a point opposite the side where the hinge mechanism 24 of the container main body 21 is arranged (the side where the cover member 23 is joined).

This latching member 27 comprises a hinge pin 27b, projecting from the outer faces of a pair of arm parts 27a, which is pivotably linked to a pair of brackets 27c that project from a peripheral part of the container main body 21; a hook part 27d which is engageable with tongue piece 23b projecting from the free end of the cover member 23 is provided at the free end of the latching member 27.

Figure 7:
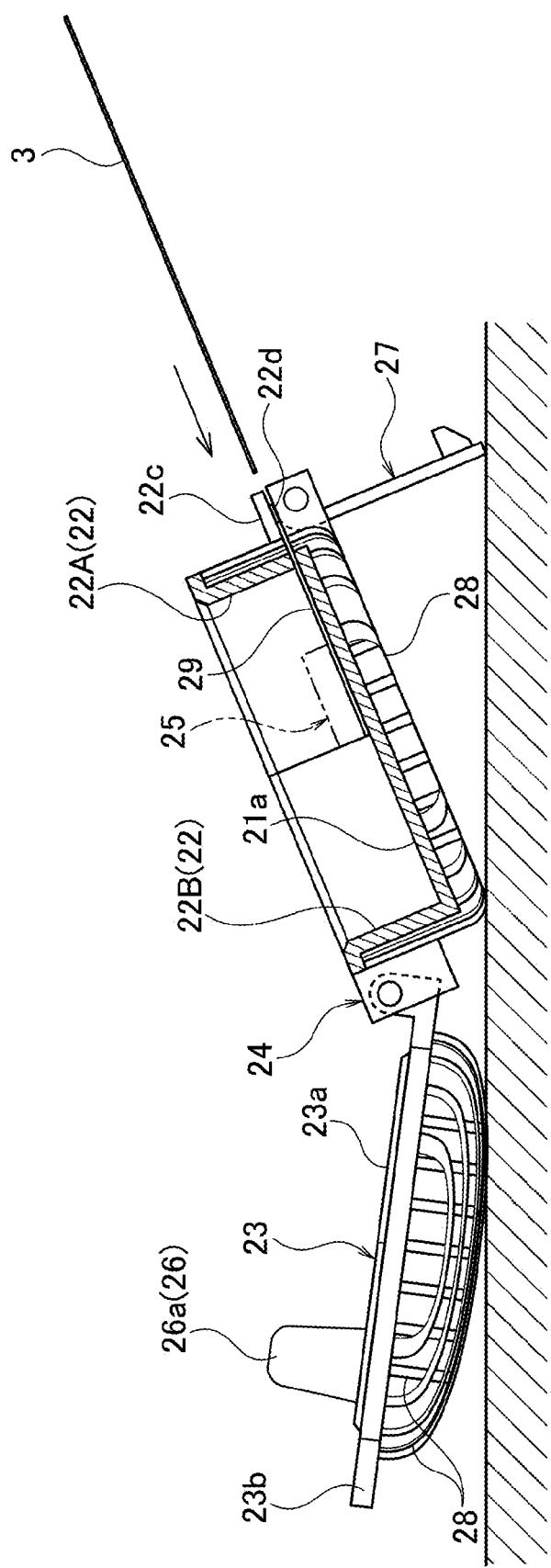
FIG. 7 is a cross sectional view of an example of use of an eraser moulding toy where setting of a design sheet at an intermediate stage is shown.

Furthermore, as shown in FIG. 7, the latching member 27 can act as a step for positioning the container main body 21 at the required angle of inclination by pivoting of said latching member through approximately 90° below the container main body 21, in order to restrict the pivoting of the container main body at the peripheral part thereof.

A plurality of heat-radiating fins 28 are then provided on the outer surface of the container main body 21 and the cover member 23. In this mode of embodiment, the heat-radiating fins 28 are formed on the container main body 21 in a fine lattice shape on the lower surface and the peripheral part thereof, i.e. on the lower surface of the bottom plate 21a and between the bottom plate 21a and the flange 22a of the moulding part 22. Furthermore, the heat-radiating fins 28 are formed in a similar lattice shape on the upper surface of the cover member 23; the heat-radiating fins 28 of the cover member 23 are formed overall as an arcuate projecting surface, and are designed so that the overall shape of the moulding container 2 when the cover member 23 is closed resembles a circular dome from the outside.

Figure 2A:
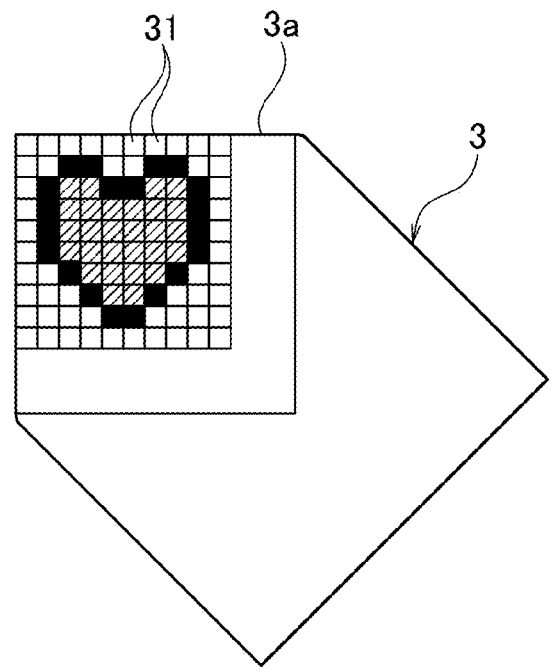
FIG. 2A is a plan view of the design sheet.
Figure 2B:
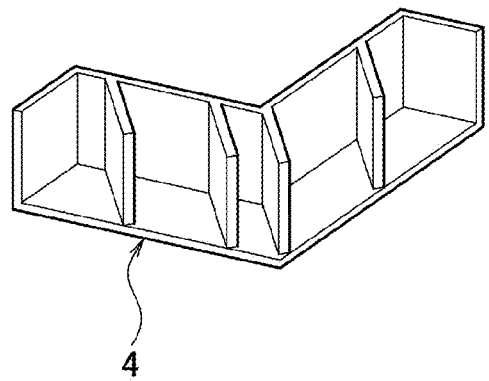
FIG. 2B is an oblique view of the back face of the spacer.
Figure 2C:
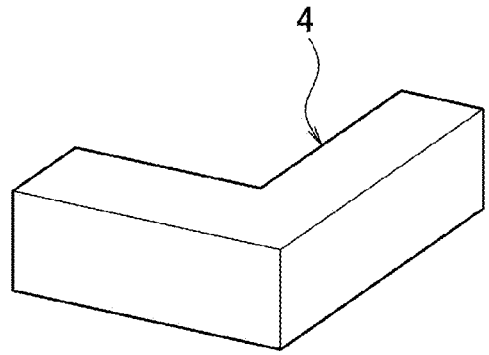
FIG. 2C is an oblique view of the front face of the spacer.
Figure 3A:
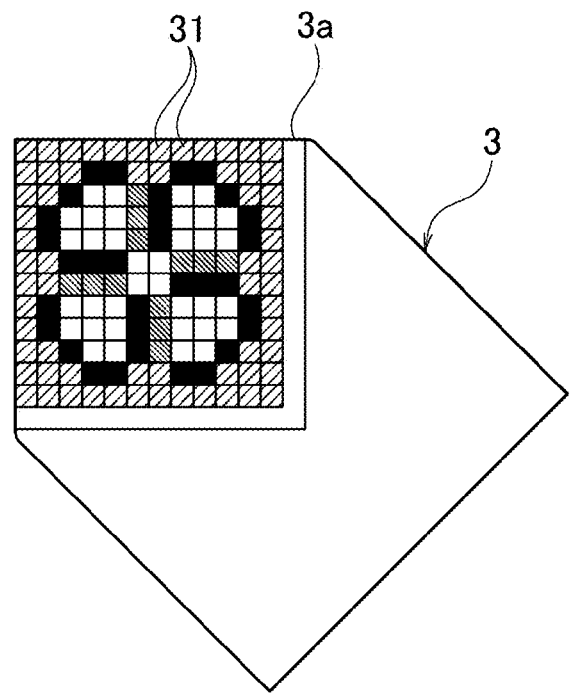
FIG. 3A is a plan view of a design sheet.
Figure 3B:
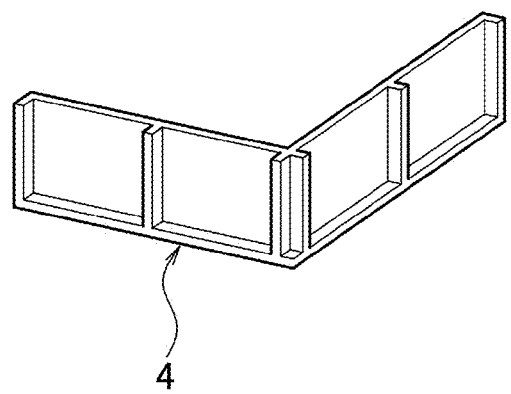
FIG. 3B is an oblique view of a back face of a spacer.
Figure 3C:
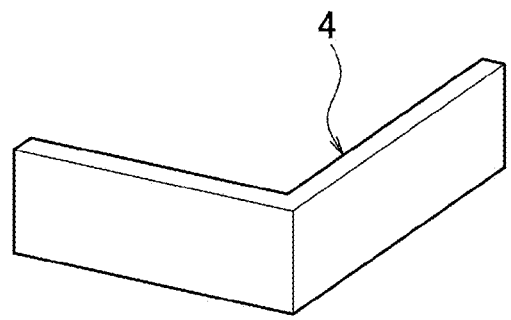
FIG. 3C is an oblique view of a front face of a spacer.
Figure 4A:
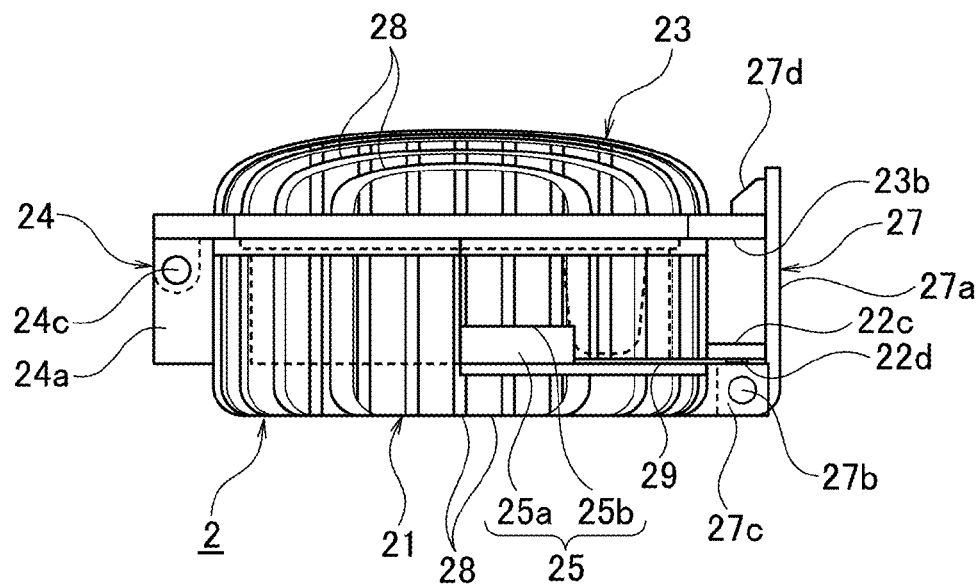
FIG. 4A is a side view of moulding container.
Figure 4B:
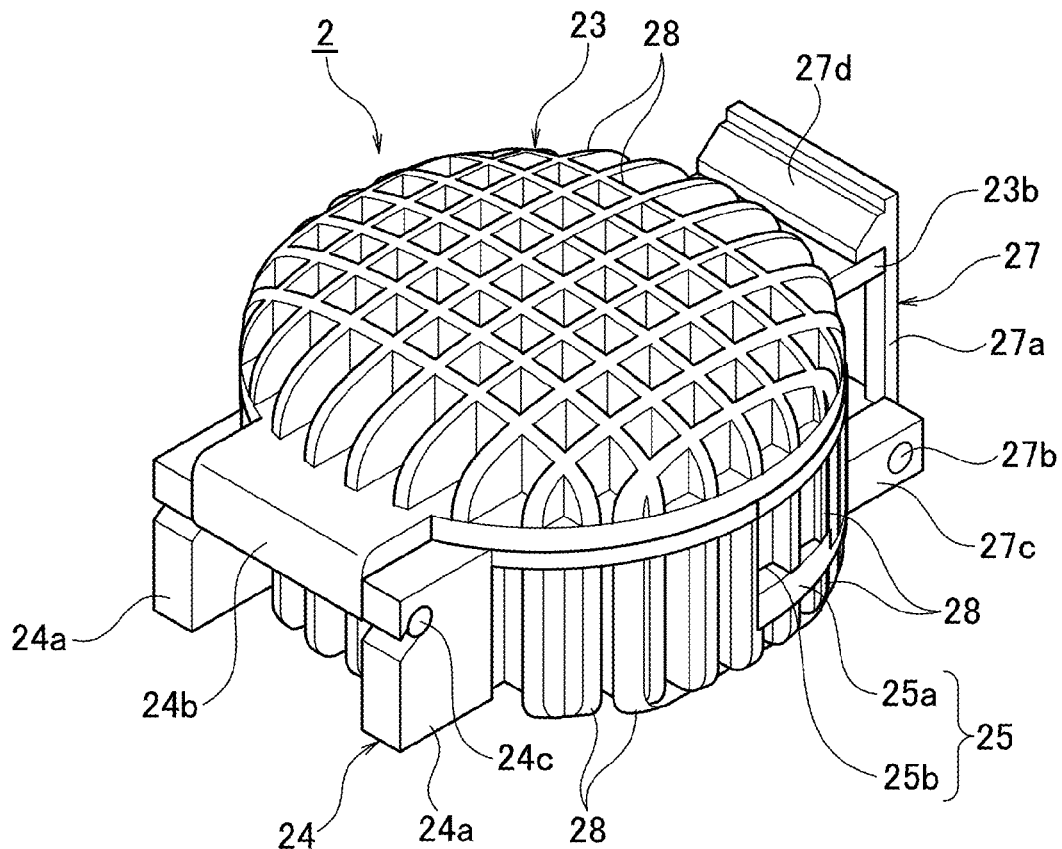
FIG. 4B is an oblique view thereof.
Figure 5:
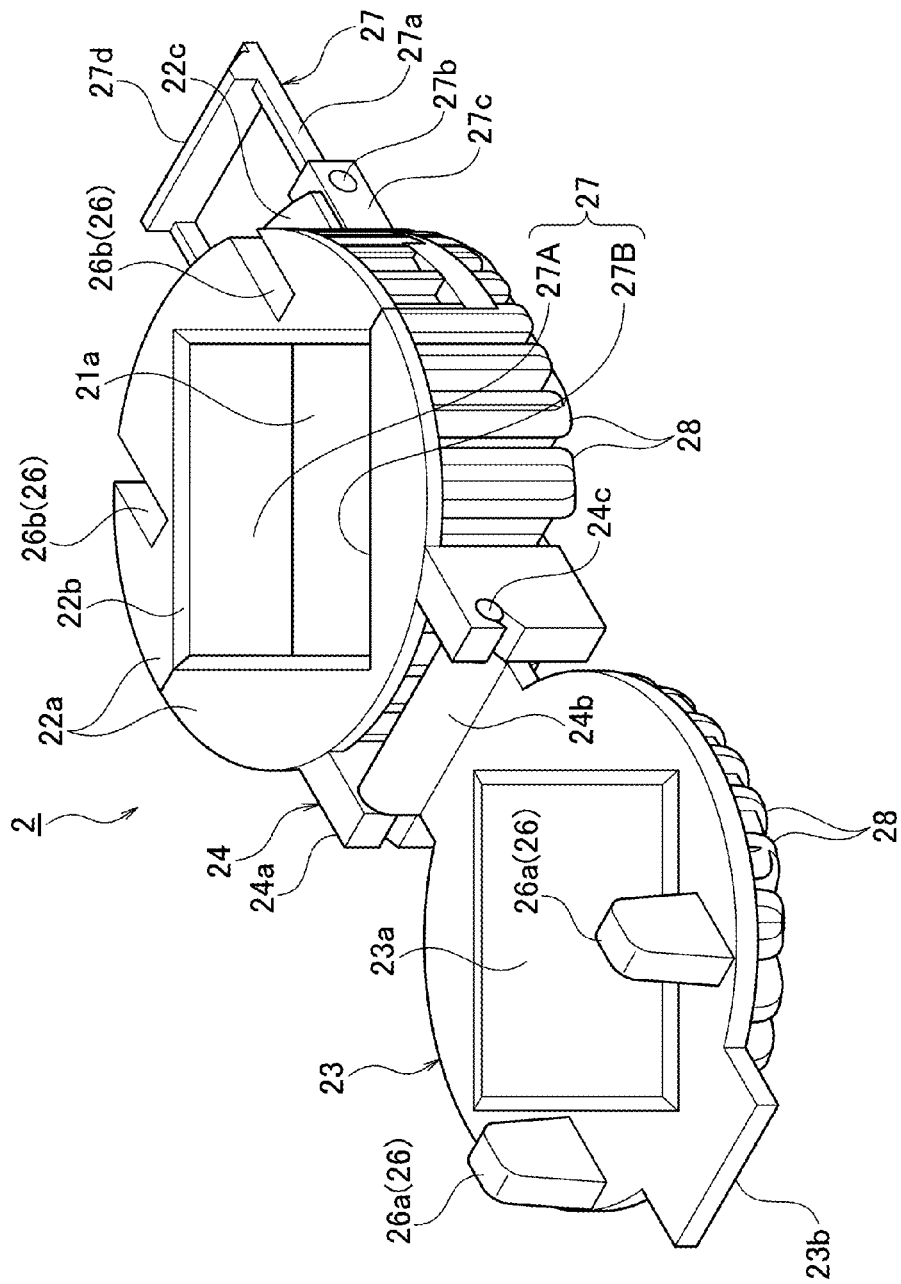
FIG. 5 is an oblique view of an open moulding container.
Figure 6:
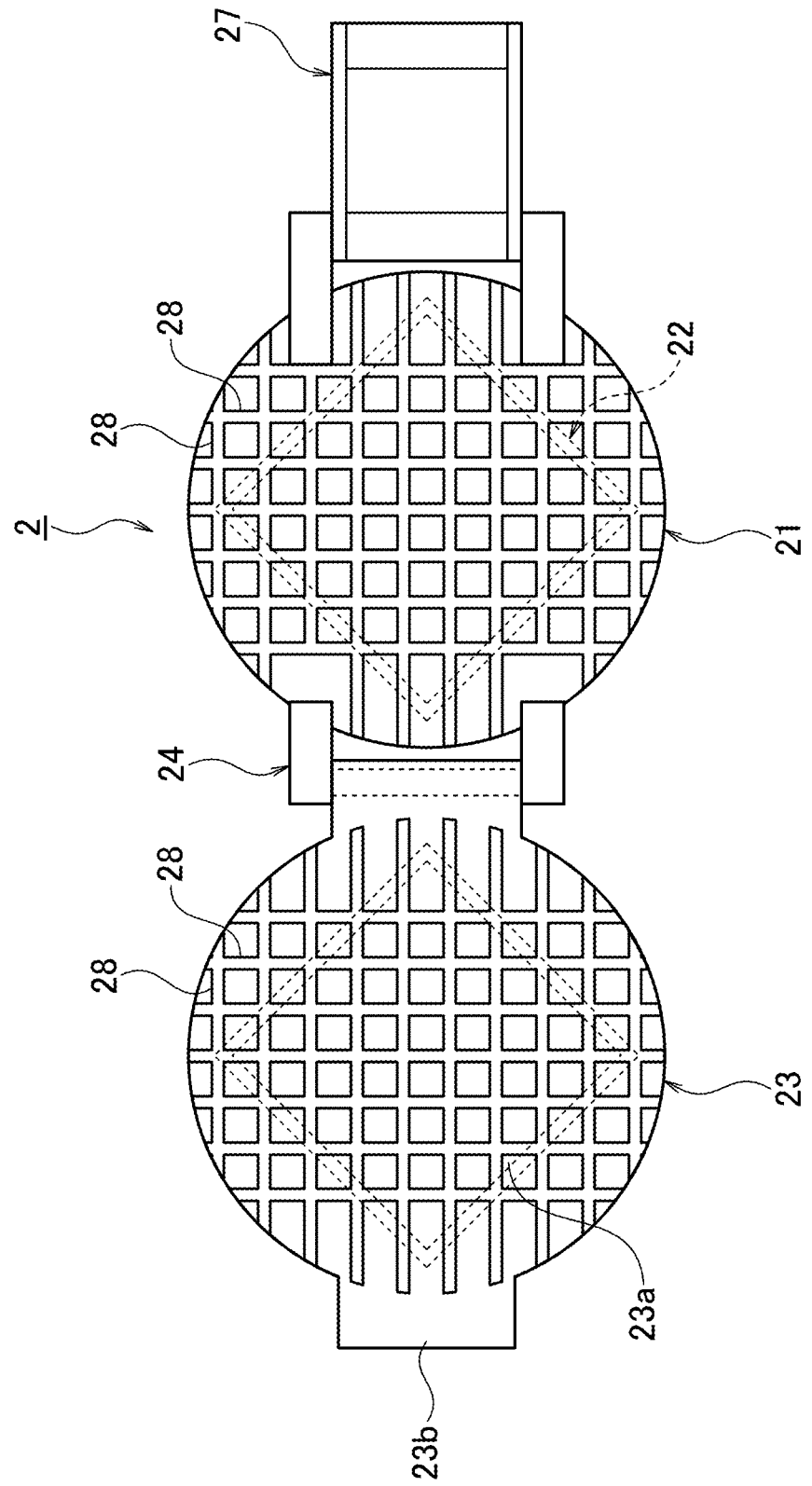
FIG. 6 is a plan view seen from a lower side of the moulding container shown in FIG. 5.

The eraser members 1 are cut one at a time from the linked pieces 11 and housed upright in the moulding part 22 of the moulding container 2 so as to describe the required pattern or design etc., and a design sheet 3 on which is printed a required pattern or design etc., as shown in FIGS. 2 and 3, is used so that even a young child etc. can easily produce this pattern or design etc. by copying the pattern or design etc. on the design sheet 3.

The pattern or design etc. on the design sheet 3 is drawn in the required colours on squares 31 which are inscribed over the cross-sectional shape of the eraser members 1 which are linked together; the design sheet 3 is positioned on the bottom surface of the moulding part 22, and eraser members 1 of differing colours are housed so as to replicate the colouring of the squares 31, using these squares as a reference.

A slit 29 is provided in a peripheral wall base part of the moulding part 22, as shown in FIG. 7, in order to position the design sheet 3 on the bottom surface of the moulding part 22, and the design sheet 3 can be inserted onto or removed from the bottom surface of the moulding part 22 through this slit 29.

In this mode of embodiment, the slit 29 is formed between the lower surface of the moveable frame 22A and the bottom plate 21a in the moulding part 22, and the slit 29 is formed as a slightly larger gap than the thickness of the design sheet 3 by adjusting the heightwise position of engagement in the vertical direction between the protrusions 25a and the grooves 25b of the positioning part 25 of the moveable frame 22A. Furthermore, the design sheet 3 is inserted onto and removed from the bottom surface of the moulding part 22 by using the pair of protrusions 25a, 25a of the positioning part 25, which are positioned at both ends of the slit 29, as insertion guides.

Accordingly, the design sheet 3 is formed as a strip having a sheet width corresponding to the widthwise dimensions between the pair of protrusions 25a, 25a, and an insertion end 3a thereof is formed as a triangular shape which corresponds to the shape of the inner surface of the peripheral wall of the fixed frame 22B; the pattern or design etc. is printed on one or both faces at the triangular insertion end 3a.

The mould size of the moulding part 22 can be changed by means of the spacer 4 which can be inserted or removed along the inner surface of the peripheral wall of the moulding part 22; for example, the spacer 4 in this mode of embodiment is formed as an L-shape which follows the inner surface of the peripheral wall of the fixed frame 22B, and this spacer 4 is inserted or removed along the inner surface of the peripheral wall of the fixed frame 22B.

In this way, the mould size of the moulding part 22 can be changed by means of the spacer 4, and therefore various types of design sheet 3 having different sizes of the pattern or design etc. printed at the insertion end 3a thereof can be arranged, as shown in FIGS. 2 and 3.

Furthermore, either of the following methods may be adopted when the design sheet 3 is positioned on the bottom surface of the moulding part 22: either the moveable frame 22A is set in alignment with the fixed frame 22B and the design sheet is inserted from the slit 29; or the moveable frame 22A is removed and the insertion end 3a of the design sheet 3 is aligned with the inner surface of the peripheral wall of the fixed frame 22B and the design sheet is positioned on the bottom plate 21a, then the moveable frame 22A is set in alignment with the fixed frame 22B from above. In either case, a sheet pressing piece 22c having a small protrusion 22d on the lower surface thereof for lightly pressing the surface of the design sheet 3, as shown in FIG. 7, is formed at the outer peripheral edge at the bottom surface of the moveable frame 22A, arranged so as to project between the pair of brackets 27c, 27c to which the latching member 27 is linked, in order to prevent the design sheet 3 from becoming offset in the direction of withdrawal from the slit 29 while the eraser members 1 are being placed inside.

The process for moulding an eraser having a coloured pattern or design using the abovementioned toy set will be described below in detail.

As shown in FIG. 7, the cover member 23 of the moulding container 2 is first of all opened, and the latching member 27 is pivoted through approximately 90° below the container main body 21, as far as the restriction position.

By means of this, the container main body 21 can be statically positioned on a table or desk etc. at a specific angle of inclination, using the latching member 27 as a step.

Next, the moveable frame 22A of the moulding part 22 is either removed or left in place, and the required design sheet 3 is positioned on the bottom surface of the moulding part 22 from the slit 29 (see FIG. 7).

Figure 8:
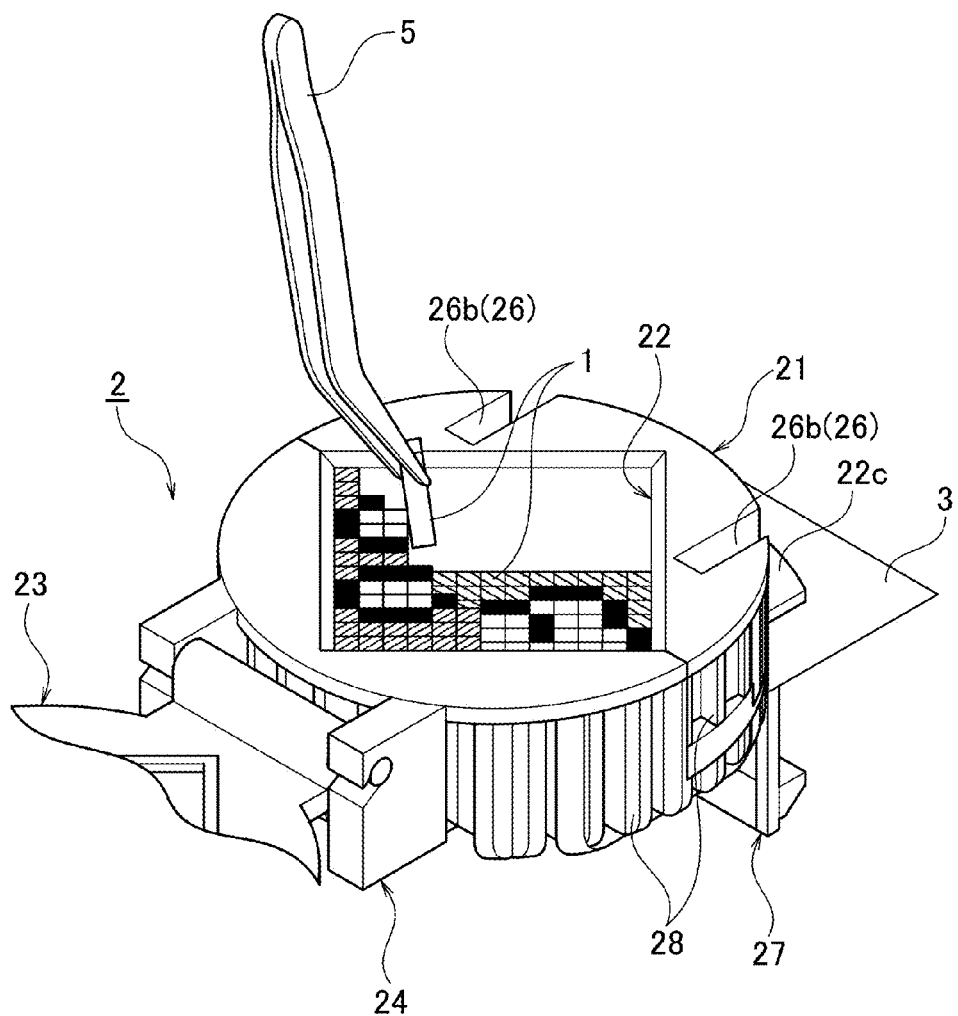
FIG. 8 is an oblique view thereof, showing a housing of an eraser members at an intermediate stage.

Eraser members 1 are then cut one at a time from the linked pieces 11, and picked up using the tweezers 5 and received upright on the moulding part 22, as shown in FIG. 8. At this point, the container main body 21 is statically positioned at a specific angle of inclination with a corner part of the fixed frame 22B tilted downwards, and therefore the eraser members 1 are received in the moulding part 22 with different coloured members being selected to replicate the colour of the squares on the design sheet, using the squares as a reference, and taking this corner part as the starting point for placing the members inside.

By means of this, the end faces of the eraser members 1 form the same pattern or design etc. which is printed on the design sheet 3, and therefore the design sheet 3 is withdrawn to outside the moulding part 22 from the slit 29.

Figure 9:
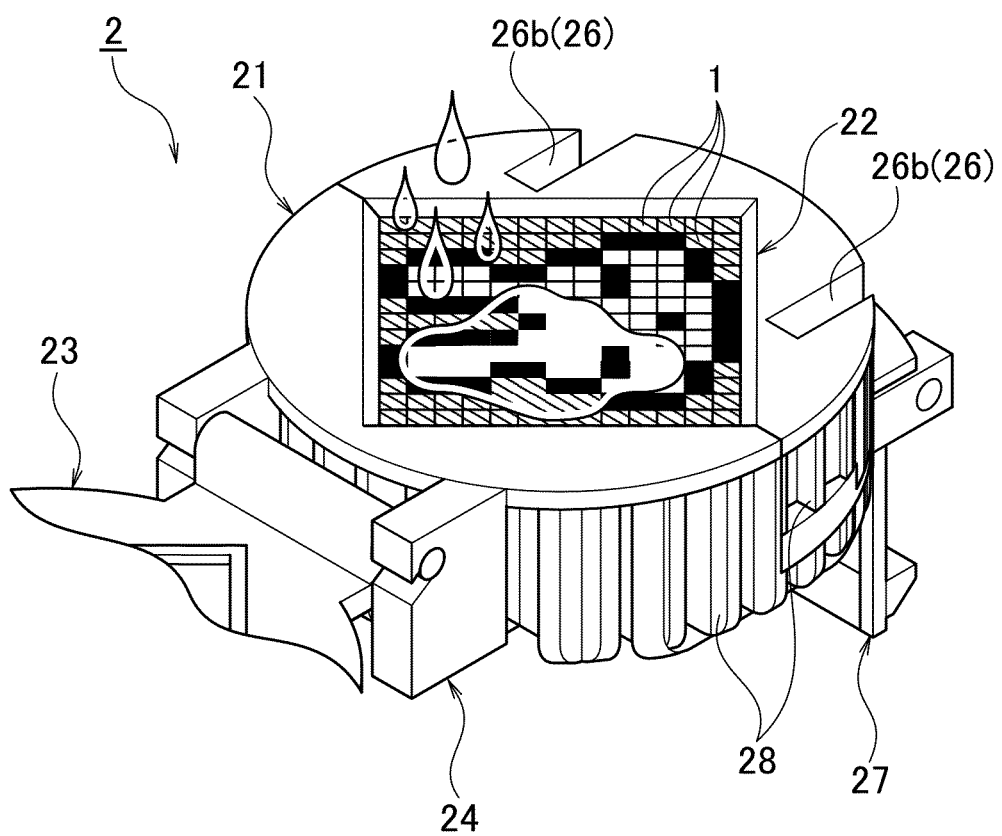
FIG. 9 is an oblique view thereof, showing supplying of water to areas between eraser members at an intermediate stage.
Figure 10:
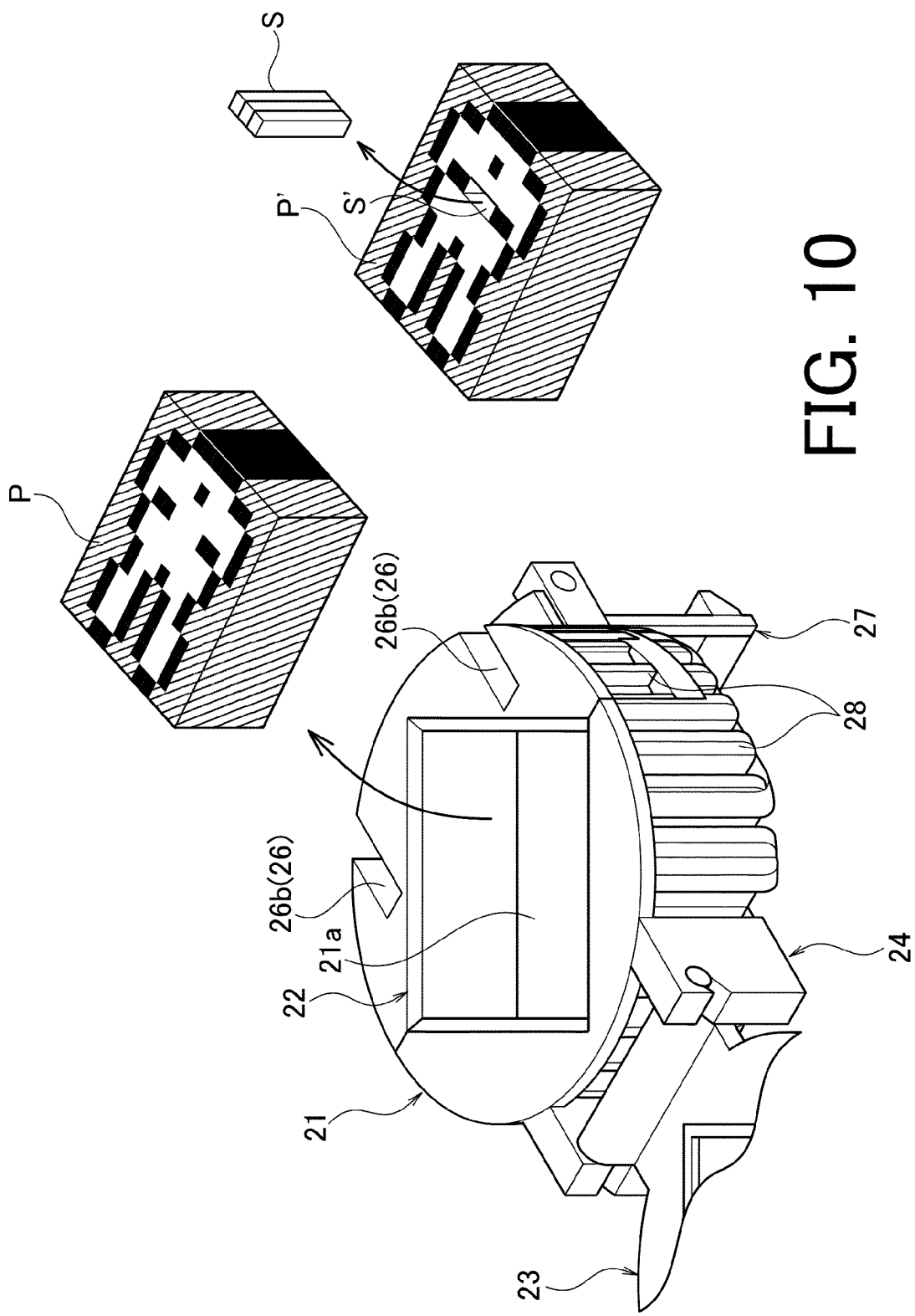
FIG. 10 is an oblique view thereof, showing a demoulded state of a moulded eraser article.

A suitable amount of water is impregnated in the areas between the eraser members 1 by dripping a suitable amount of water onto the planar surface of the housed plurality of eraser members 1, as shown in FIG. 9, using a dropper which is not depicted, or by wetting the planar surface of the housed members using a spray.

Next, the cover member 23 is closed and fixed to the container main body 21 by means of the latching member 27; the top opening of the moulding part 22 is sealed closed, and the moulding container 2 is introduced into a heater (not depicted) for heating. It should be noted that by closing the cover member 23, the water which has been dropped on the planar surface of the housed eraser members is pressured so as to penetrate the contact surfaces between the eraser members 1.

The eraser members are heated for 40 seconds at 730 W or 60 seconds at 500 W, for example, and the thermal induction of the water molecules present between the surfaces of the eraser members 1 promotes heating between the surfaces of the eraser members 1 so that the surfaces of the eraser members 1 are fused together.

Then, once the heating is complete, the moulding container 2 is removed from the heater and allowed to cool naturally, after which the cover member 23 is opened and the moulding is demoulded, and the moulded eraser article P which is block-shaped and has the required coloured pattern or design on both surfaces is complete.

This moulded eraser article P can be easily demoulded by removing the moveable frame 22A.

When the eraser is moulded, if a required part of the eraser members 1 which are housed is formed by a core S comprising a material which does not fuse with the eraser members 1, for instance glass or metal, then it is possible to form a moulded eraser article P' having a pattern or design with a through-hole S' at the required portion by removing this core S after the heating and demoulding.

As described above, according to the eraser moulding toy of this mode of embodiment, it is possible to mould a block-shaped eraser P having a coloured pattern or design in a specific moulded shape by housing a plurality of eraser members 1 made of thermofusible coloured synthetic resin and having the same shape in a moulding container 2, so as to form the required pattern or design etc. with different colours, and by impregnating the areas between the eraser members 1 with a suitable amount of water and heating this water to the required temperature so that the surfaces of the eraser members 1 are fused together. In this way, even young children etc. are easily capable of moulding the eraser P having a pattern or design because the process to mould the eraser P only involves an operation to place the plurality of eraser members 1 one at a time in the moulding container 2 so that they are housed in a state of contact, and then impregnating the areas between the eraser members 1 with a suitable amount of water, followed by heating; no especially difficult operations are required.

Moreover, the required pattern or design etc. is gradually completed using a process in which different coloured eraser members 1 are housed in a state of contact in the moulding container 2, and therefore the young child etc. can be motivated to create the pattern or design etc., which is a source of interest for the young child etc.

In this mode of embodiment especially, the moulding container 2 comprises a heat-resistant container main body 21 having a moulding part 22 which is open at the top for housing the plurality of eraser members 1 upright, and a cover member 23 which is pivotably linked to the container main body 21 and can close the top opening of the moulding part 22; the eraser members 1 can be housed upright in succession inside the moulding part 22, and the planar surface of the housed eraser members can be wetted with water before the cover member 23 is closed, and the moulding container 2 can be heated, and therefore even young children etc. can easily house the eraser members 1 and heat the assembly.

Furthermore, the plurality of heat-radiating fins 28 are provided on the outer surface of the container main body 21 and of the cover member 23, and therefore the heat-radiating effect of the moulding container 2 is increased, so the cooling time for the moulding container 2 and the moulded article is shortened, which makes it possible to shorten the moulding cycle, and it is possible to prevent the moulding time becoming unnecessarily long.

Moreover, the heat-radiating fins 28 are formed in a lattice shape, and if a young child etc. grasps the moulding container 2 with his or her hand, the contact area with the child's fingers is minimized, and therefore it is possible to eliminate the danger of burns when the moulding container 2 is removed from the heater after the heating is finished.

Furthermore, if the latching member 27, which locks the cover in order to fix the cover member 23 to the container main body 21 once said cover member has been closed, is pivoted below the container main body 21, this member serves as a step for statically positioning the container main body 21 at the required angle of inclination, and therefore it is possible to easily place the eraser members 1 inside the container main body 21 without the eraser members falling over, by placing the eraser members 1 upright with the container main body 21 in an inclined leaning state.

Furthermore, a semiperipheral part of the moulding part 22 of the container main body 21 consists of a moveable frame 22A which is detachable from the container main body 21, and therefore this offers the advantage that the moulded eraser P can be easily demoulded by removing this moveable frame 22A.

In addition, the design sheet 3, which is inserted onto and removed from the bottom surface inside the moulding part 22 from a slit 29 in the peripheral wall base part of the moulding part 22, has the required pattern or design etc. printed thereon, and this pattern or design etc. is drawn in the required colours on squares 31 which are inscribed over the cross-sectional shape of the eraser members 1 which are linked together, and therefore if the design sheet 3 is used so that the eraser members 1 of differing colours are housed to replicate the colouring of the squares 31, taking the squares 31 as a reference, it is possible to easily produce a pattern or design etc. in the same colours as the design sheet 3 using the eraser members 1.

Furthermore, the mould size of the moulding part 22 can be changed by means of the spacer 4 which can be inserted or removed along the inner surface of the peripheral wall of the moulding part, and therefore various different sizes of eraser P can be freely obtained using this spacer 4.

The eraser members 1 are linked together in a strip shape with the thin parts 1a at the boundaries to allow eraser members 1 of the same colour to be cut into a plurality of members, and the eraser members are cut one at a time from the thin parts 1a when they are used, and therefore the plurality of eraser members 1 can be held neatly together in a compact fashion, and this makes it possible to easily house the toy after use because the packaging for the toy set is obviously more compact.

Furthermore, when the eraser members 1 are received in the moulding container 2, if a required part of the eraser members which are housed is formed by a core S comprising a material which does not fuse with the eraser members 1 and the core S is removed after moulding is complete, then it is possible to form a moulded eraser article P' having a pattern or design with a through-hole S' at the required portion, and therefore it is possible to produce a hole in the shape of the core S at a portion corresponding to the eye, mouth or nose etc. of a character from a popular cartoon, or similar, which is of interest to young children etc.

It should be noted that an example has been presented in this mode of embodiment in which the moulding part 22 is square, but the moulding part is not limited to polygonal shapes, and it is feasible to set any shape.

Furthermore, a suitable amount of water is impregnated in the areas between the eraser members 1, but water does not need to be impregnated if the eraser members are made of a material (a material containing water) which allows the eraser members to be fused together by heating at a specific temperature.

An example has been presented here of a case in which the plurality of eraser members 1 have the same shape with the same length and cross-sectional size, but it is also possible, depending on the case, to house some eraser members with different lengths and cross-sectional sizes. It is possible to obtain a non-planar eraser P by housing eraser members of differing lengths.

In addition, the eraser members 1 are not limited to a square cross-sectional shape, provided that the cross-sectional shape allows the surfaces of the eraser members to come into contact with one another when they are housed inside the moulding part 22.

The preceding description has been presented only to illustrate and describe exemplary embodiments of the present eraser moulding toy and method of forming an eraser. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. An eraser moulding toy comprising:
   a plurality of eraser members made of thermofusible coloured synthetic resin and having a predetermined shape, and
   a moulding container comprising a container main body having a moulding part for housing the plurality of eraser members in a state of contact and a cover member which is provided so as to be able to close the top opening of the moulding part;
   wherein the moulding part has such a shape that the plurality of eraser members having the predetermined shape is horizontally arranged without any gap and end faces of the plurality of eraser member form an upper face,
   wherein the toy is configured such that a plurality of different coloured eraser members may be placed in the moulding container so that a required pattern or design is formed on the upper face, and it is possible to mould an eraser in which the surfaces of the eraser members are fused together by heating the moulding container.

2. An eraser moulding toy comprising:
   a plurality of eraser members made of thermofusible coloured synthetic resin and having a predetermined shape, and
   a moulding container comprising a container main body having a moulding part for housing the plurality of eraser members in a state of contact;
   wherein the moulding part has such a shape that the plurality of eraser members having the predetermined shape is arranged without any gap,
   wherein the toy is configured such that a plurality of different coloured eraser members may be placed in the moulding container so that a required pattern or design is formed by the end faces thereof, and it is possible to mould an eraser in which the surfaces of the eraser members are fused together by heating the moulding container,
   wherein the surfaces of the eraser members are fused together by impregnating the areas between the eraser members with water and heating this water, and
   wherein the moulding container comprises:
   the container main body which is open at the top, and
   a cover member which is provided so as to be able to close the top opening of the moulding part; and
   the moulding container is heat resistant such that the container may be heated in order to heat the water inside the moulding container in order to fuse the eraser members.

3. The eraser moulding toy according to claim 2, wherein a plurality of heat-radiating fins are provided on the outer surface of the container main body and the cover member.

4. The eraser moulding toy according to claim 2 or 3, characterized in that the container main body is provided with an engageable latching member at the free end of the cover member, the latching member being pivotably linked to a part of the container main body opposite the side where the cover member is linked; and the latching member is configured such that it can act as a step for positioning the container main body at the required angle of inclination by pivoting of said latching member below the container main body.

5. An eraser moulding toy comprising:
   a plurality of eraser members made of thermofusible coloured synthetic resin, and
   a moulding container for housing the plurality of eraser members in a state of contact;
   wherein the toy is configured such that a plurality of different coloured eraser members may be placed in the moulding container so that a required pattern or design is formed by the end faces thereof, and it is possible to mould an eraser in which the surfaces of the eraser members are fused together by heating the moulding container,
   wherein the moulding container comprises:
   a container main body having a moulding part of the required shape of the eraser to be formed, which is open at the top and houses the eraser members, and
   a cover member which is pivotably linked to the container main body so as to be able to close the top opening of the moulding part; and
   the moulding container is heat resistant such that the container may be heated in order to heat water inside the moulding container in order to fuse the eraser members, wherein
   a semiperipheral part of the moulding part consists of a moveable frame which can be detached from the container main body.

6. An eraser moulding toy comprising:
   a plurality of eraser members made of thermofusible coloured synthetic resin, and
   a moulding container for housing the plurality of eraser members in a state of contact;
   wherein the toy is configured such that a plurality of different coloured eraser members may be placed in the moulding container so that a required pattern or design is formed by the end faces thereof, and it is possible to mould an eraser in which the surfaces of the eraser members are fused together by heating the moulding container,
   wherein the moulding container comprises:
   a container main body having a moulding part of the required shape of the eraser to be formed, which is open at the top and houses the eraser members, and
   a cover member which is pivotably linked to the container main body so as to be able to close the top opening of the moulding part; and
   the moulding container is heat resistant such that the container may be heated in order to heat water inside the moulding container in order to fuse the eraser members,
   wherein a slit is provided in a peripheral wall base part of the moulding part, and a design sheet, on which a required pattern or design is printed can be inserted onto or removed from the bottom surface inside the moulding part through this slit, and wherein a pattern or design may be drawn on the design sheet in the required colours on squares which are inscribed over the cross-sectional shape of the eraser members which are to be linked together; and eraser members of differing colours may be placed so as to replicate this colouring, using the design sheet as a reference.

7. The eraser moulding toy according to claim 3, wherein the heat-radiating fins are formed in a lattice shape.

8. The eraser moulding toy according to claim 1, wherein the plurality of eraser members has faces capable of being brought in face contact with each other.

9. An eraser moulding toy comprising:

a plurality of eraser members made of thermofusible coloured synthetic resin, and a moulding container for housing the plurality of eraser members in a state of contact;

wherein the toy is configured such that a plurality of different coloured eraser members may be placed in the moulding container so that a required pattern or design is formed by the end faces thereof, and it is possible to mould an eraser in which the surfaces of the eraser members are fused together by heating the moulding container wherein the moulding container comprises:

a container main body having a moulding part of the required shape of the eraser to be formed, which is open at the top and houses the eraser members, and a cover member which is pivotably linked to the container main body so as to be able to close the top opening of the moulding part, the moulding container is heat resistant such that the container may be heated in order to heat water inside the moulding container in order to fuse the eraser members, and wherein the mould size of the moulding part can be changed using a spacer which can be inserted into or removed from the moulding part along an inner surface on the peripheral wall thereof.

* * * * *